US012074401B2

(12) United States Patent
Takeuchi et al.

(10) Patent No.: US 12,074,401 B2
(45) Date of Patent: Aug. 27, 2024

(54) TERMINAL AND WIRE WITH TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shunya Takeuchi, Mie (JP); Masaaki Tabata, Mie (JP); Hiroki Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 396 days.

(21) Appl. No.: 17/601,599

(22) PCT Filed: Apr. 2, 2020

(86) PCT No.: PCT/JP2020/015217
§ 371 (c)(1),
(2) Date: Oct. 5, 2021

(87) PCT Pub. No.: WO2020/209179
PCT Pub. Date: Oct. 15, 2020

(65) Prior Publication Data

US 2022/0181799 A1 Jun. 9, 2022

(30) Foreign Application Priority Data

Apr. 10, 2019 (JP) ................................ 2019-074921

(51) Int. Cl.
*H01R 4/50* (2006.01)
*H01R 4/18* (2006.01)
*H01R 4/52* (2006.01)

(52) U.S. Cl.
CPC ........... *H01R 4/5066* (2013.01); *H01R 4/185* (2013.01); *H01R 4/52* (2013.01)

(58) Field of Classification Search
CPC ........ H01R 4/5066; H01R 4/185; H01R 4/52; H01R 4/489; H01R 13/585
See application file for complete search history.

(56) References Cited

U.S. PATENT DOCUMENTS 5,618,202 A * 4/1997 Okuyama ............ H01R 12/775 439/497
6,729,895 B1 5/2004 Bryan
(Continued)

FOREIGN PATENT DOCUMENTS

CN 100407507 C * 7/2008 ......... H01R 13/5208
CN 103247874 A * 8/2013
EP 0827238 A2 * 3/1998

OTHER PUBLICATIONS

International Search Report issued on Jun. 30, 2020 for WO 2020/209179 A1 (4 pages).

*Primary Examiner* — Jean F Duverne
(74) *Attorney, Agent, or Firm* — Venjuris, P.C.

(57) ABSTRACT

A terminal 12 to be connected to a front end part of a wire 11 in an extending direction is provided with a terminal body 15 including a wire connecting portion 20 to be connected to the wire 11, and a shell to be externally fit to the wire connecting portion 20. The wire connecting portion 20 includes a sandwiching portion 18A, 18B extending in the extending direction of the wire 11 and configured to sandwich the wire 11. The shell includes a resilient pressurizing (Continued)

portion for resiliently pressurizing the sandwiching portion 18A, 18B toward the wire 11.

8 Claims, 11 Drawing Sheets

(56) References Cited

U.S. PATENT DOCUMENTS

| | | | | |
|---|---|---|---|---|
| 7,306,495 | B2 | 12/2007 | Hashimoto et al. | |
| 2002/0119710 | A1 | 8/2002 | Vello et al. | |
| 2002/0173206 | A1 | 11/2002 | Dobrinski et al. | |
| 2009/0283293 | A1* | 11/2009 | Hiner | H01R 4/22<br>174/87 |

* cited by examiner

TERMINAL AND WIRE WITH TERMINAL

CROSS REFERENCE TO RELATED APPLICATIONS

This application is a national phase of PCT application No. PCT/JP2020/015217, filed on Apr. 2, 2020, which claims priority from Japanese patent application No. 2019-074921, filed on Apr. 10, 2019, all of which are incorporated herein by reference.

TECHNICAL FIELD

The present disclosure relates to a terminal and a wire with terminal.

BACKGROUND

Conventionally, a wire with terminal is known in which a terminal is connected to a core exposed from an end of a wire. Some of such terminals include, for example, a crimping portion to be crimped to the core exposed from the end of the wire from outside.

The above terminal is crimped to the wire, for example, as follows. First, the terminal of a predetermined shape is formed by press-working a metal plate material. Subsequently, the terminal is placed on a placing portion of a lower die located on a lower side, out of a pair of dies relatively movable in a vertical direction. Subsequently, the core exposed from the end of the wire is placed on the crimping portion of the terminal. Thereafter, one or both of the pair of dies is/are moved in mutually approaching direction(s), and the crimping portion is sandwiched between a crimper of the upper die and the placing portion of the lower die, whereby the crimping portion is crimped to the core of the wire. In the above way, the terminal is connected to the end of the wire (see Patent Document 1).

PRIOR ART DOCUMENT

Patent Document

Patent Document 1: JP 2005-050736 A

SUMMARY OF THE INVENTION

Problems to be Solved

However, according to the above technique, since a relatively large-scale facility such as dies or a jig for crimping the crimping portion of the terminal to the core of the wire is necessary, facility investment is necessary and there is a problem of increasing manufacturing cost.

The present disclosure was completed on the basis of the above situation and aims to provide a terminal with reduced manufacturing cost.

Means to Solve the Problem

The present disclosure is directed to a terminal to be connected to a front end part of a wire in an extending direction, the terminal including a terminal body having a wire connecting portion to be connected to the wire, and a shell to be externally fit to the wire connecting portion, wherein the wire connecting portion includes a sandwiching portion extending in the extending direction of the wire, the sandwiching portion sandwiching the wire, and the shell includes a resilient pressurizing portion for resiliently pressurizing the sandwiching portion toward the wire.

Effect of the Invention

According to the present disclosure, it is possible to provide a terminal with reduced manufacturing cost.

DETAILED DESCRIPTION TO EXECUTE THE INVENTION

Description of Embodiments of Present Disclosure

Figure 1:
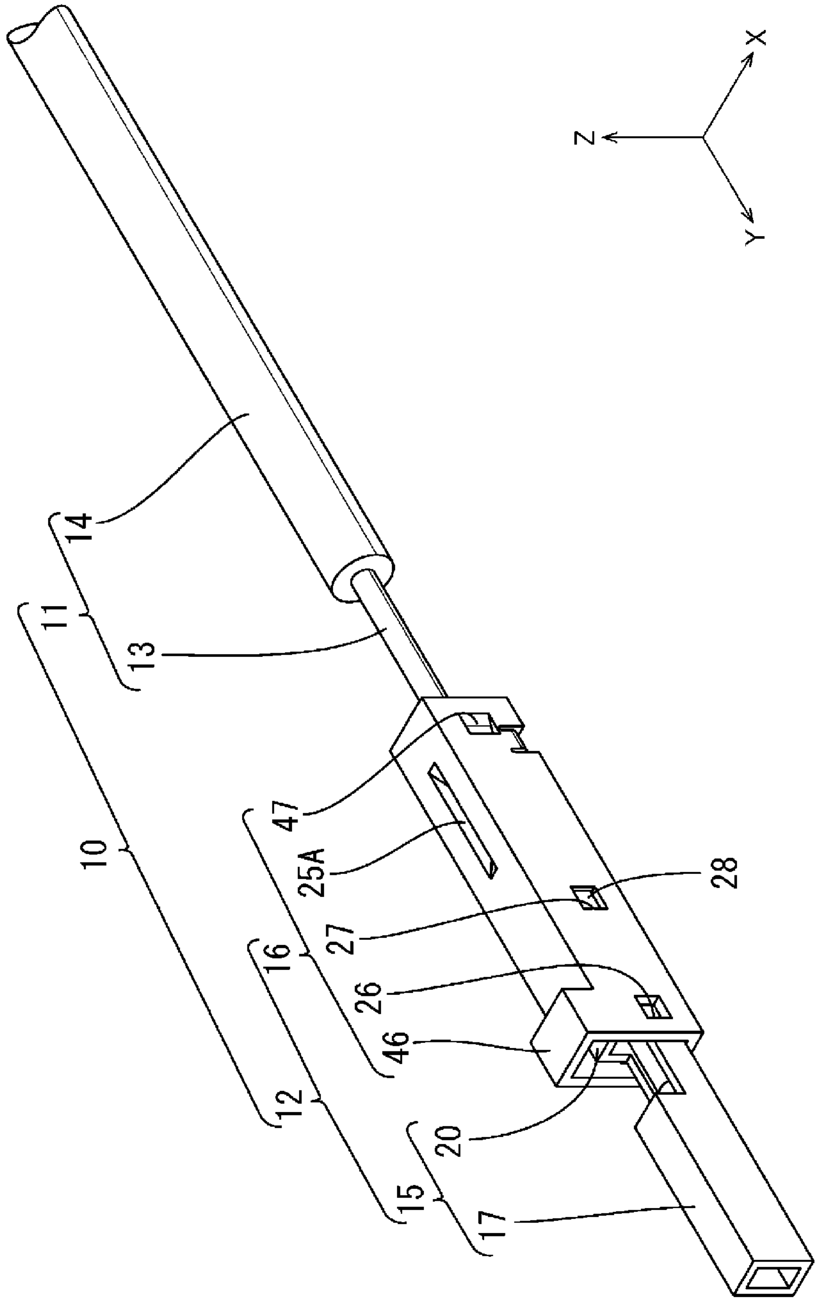
FIG. 1 is a perspective view showing a wire with terminal according to an embodiment.

First, embodiments of the present disclosure are listed and described.

(1) The terminal of the present disclosure is a terminal to be connected to a front end part of a wire in an extending direction and includes a terminal body including a wire connecting portion to be connected to the wire, and a shell to be externally fit to the wire connecting portion, wherein the wire connecting portion includes a sandwiching portion extending in the extending direction of the wire, the sandwiching portion sandwiching the wire, and the shell includes a resilient pressurizing portion for resiliently pressurizing the sandwiching portion toward the wire.

According to the present disclosure, the sandwiching portion is pressurized toward the wire by the resilient pressurizing portion, whereby the wire is sandwiched by the sandwiching portion. In this way, the terminal and the wire are electrically connected. Since the terminal and the wire need not be electrically connected by a crimping operation, a relatively large-scale jig for crimping becomes unnecessary and the manufacturing cost of the terminal can be reduced.

The resilient pressurizing portion is resiliently deformed according to a wire diameter. For example, the resilient pressurizing portion is resiliently deformed to a relatively small extent for a wire having a relatively small diameter. Since the sandwiching portion is pressurized toward the wire by a resilient force generated by resilient deformation of the resilient pressurizing portion, the wire and the sandwiching portion are electrically connected with a proper contact pressure.

On the other hand, the resilient pressurizing portion is resiliently deformed to a relatively large extent according to the wire diameter for a wire having a relatively large diameter. Since the sandwiching portion is pressurized toward the wire by a resilient force of the resilient pressurizing portion, the wire and the sandwiching portion are electrically connected with a proper contact pressure.

As just described, according to the present disclosure, a deformation amount of the springy resilient pressurizing portion changes according to the wire diameter for wires having different diameters. In this way, the wires having different diameters are sandwiched with a proper contact pressure by the sandwiching portion by a resilient force generated by resilient deformation of the resilient pressurizing portion. As a result, the wires having different diameters and the terminal can be electrically connected.

(2) Preferably, the resilient pressurizing portion is cantilevered forward or rearward along the extending direction of the wire and resiliently pressurizes the sandwiching portion toward the wire by contacting the sandwiching portion to be deflected.

Since the resilient pressurizing portion is cantilevered, one end part of the resilient pressurizing portion is a free end. Since a resilient deformation amount of the resilient pressurizing portion can be increased in this way, even a case where diameters of wires are largely different can be dealt with.

(3) Preferably, the shell is provided with an excessive deflection suppressing portion projecting inwardly of the shell, and the excessive deflection suppressing portion suppresses excessive deflection of the resilient pressurizing portion by contacting the resilient pressurizing portion.

Even if a front end part of the wire strongly butts against the springy resilient pressurizing portion when the wire is inserted into the wire connecting portion, excessive deformation of the resilient pressurizing portion is suppressed by the contact of the resilient pressurizing portion with the excessive deflection suppressing portion. Since excessive deformation of the resilient pressurizing portion to a plastic deformation region is suppressed in this way, the resilient pressurizing portion is deformed within a resilient deformation region. As a result, a resilient force can be reliably applied to the sandwiching portion, wherefore the electrical connection reliability of the wire and the terminal is improved.

(4) Preferably, the shell is disposed slidably along the extending direction of the wire with respect to the wire connecting portion, and the shell slides between a position for resiliently pressurizing the sandwiching portion and a position for not resiliently pressurizing the sandwiching portion.

Since the wire and the terminal can be electrically connected by a simple operation of sliding the slide portion along the extending direction of the wire, the manufacturing cost of the terminal can be reduced.

(5) Preferably, a guide portion for guiding the wire into the wire connecting portion by contacting the wire is provided on a rear end part of the resilient pressurizing portion in the extending direction of the wire.

The front end part of the wire slides in contact with the guide portion, thereby being guided into the wire connecting portion. In this way, the efficiency of a connecting operation of the wire and the terminal can be improved.

(6) A wire with terminal of the present disclosure includes the terminal of any one of (1) to (5) described above, and a wire connected to the terminal.

Details of Embodiment of Present Disclosure

Hereinafter, an embodiment of the present disclosure is described. The present invention is not limited to these illustrations and is intended to be represented by claims and include all changes in the scope of claims and in the meaning and scope of equivalents.

Embodiment

One embodiment of the present disclosure is described with reference to FIGS. 1 to 12. A wire with terminal 10 according to this embodiment includes a wire 11 and a terminal 12 connected to the wire 11. In the following description, a direction indicated by an arrow Z is an upward direction, a direction indicated by an arrow Y is a forward direction and a direction indicated by an arrow X is a leftward direction. Note that, for a plurality of identical members, only some may be denoted by a reference sign and the others may not be denoted by the reference sign.

[Wire 11]

As shown in FIG. 1, the wire 11 is a plurality of wires 11 are disposed to extend in the front-rear direction (an example of the extending direction). In the wire 11, the outer periphery of a core 13 is surrounded with an insulation coating 14 made of insulating synthetic resin. The core 13 according to this embodiment is composed of one metal wire. Note that the core 13 may be a stranded wire formed by twisting a plurality of metal thin wires. An arbitrary metal such as copper, copper alloy, aluminum or aluminum alloy can be appropriately selected as a metal constituting the core 13 if necessary. The core 13 according to this embodiment is made of copper or copper alloy.

[Terminal 12]

As shown in FIG. 1, the terminal 12 includes a terminal body 15 made of metal and a slide portion 16 (an example of a shell) relatively slidable with respect to the terminal body 15.

[Terminal Body 15]

Figure 2:
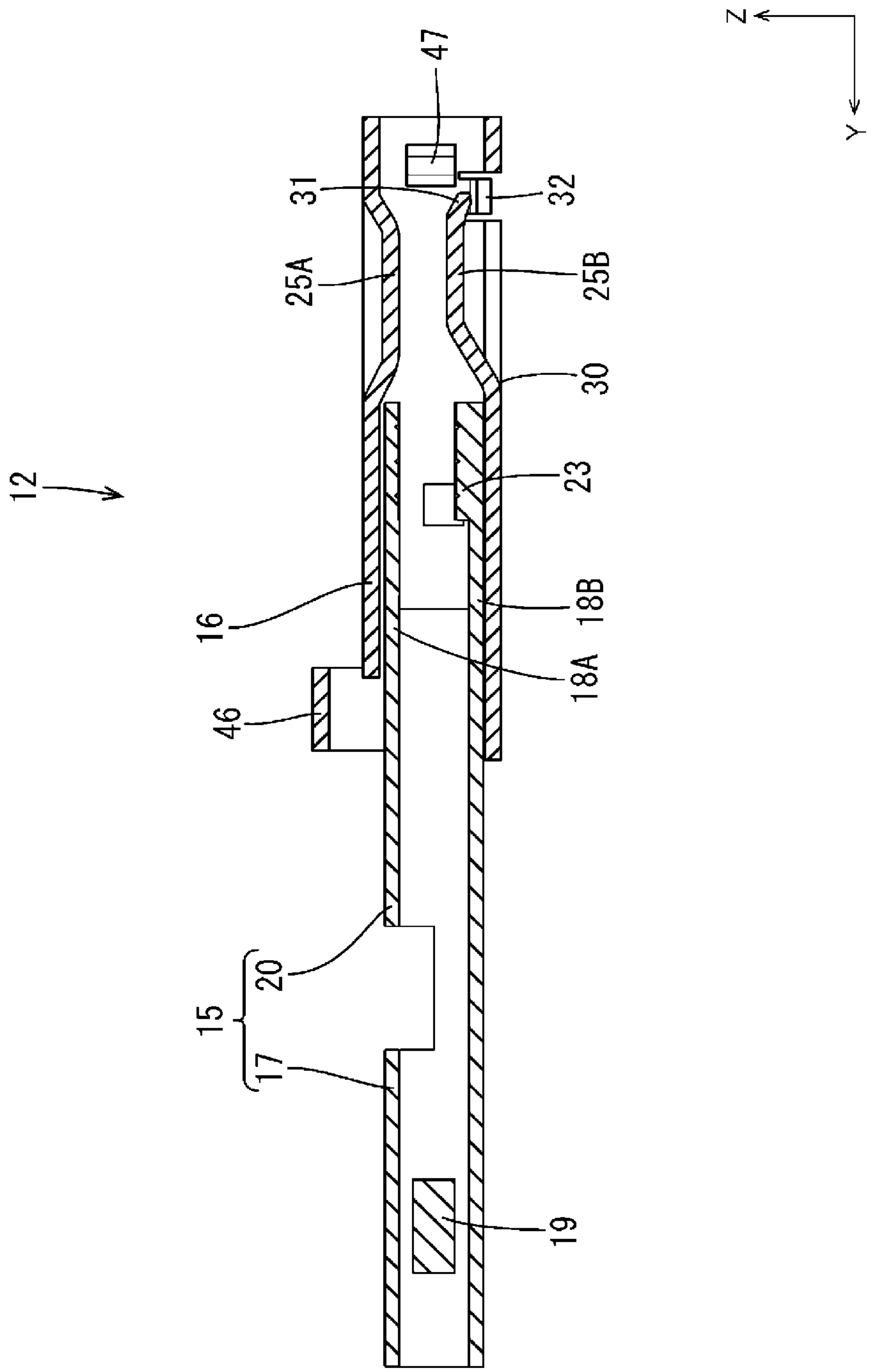
FIG. 2 is a section showing a terminal in which a slide portion is partially locked to a terminal body.

As shown in FIG. 2, the terminal body 15 is formed into a predetermined shape by a known method such as press-working, cutting or casting. An arbitrary metal such as copper, copper alloy, aluminum, aluminum alloy or stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel or silver can be appropriately selected as a metal constituting the plating layer if necessary. Tin plating is applied to the terminal body 15 according to this embodiment.

As shown in FIG. 2, the terminal body 15 includes a tube portion 17 into which an unillustrated mating terminal is insertable, and a wire connecting portion 20 located behind the tube portion 17 and to be connected to the wire 11. The wire connecting portion 20 includes an upper sandwiching portion 18A and a lower sandwiching portion 18B extending rearward.

As shown in FIG. 2, the tube portion 17 is in the form of a rectangular tube extending in the front-rear direction. The front end of the tube portion 17 is open, so that the mating terminal is insertable.

FIG. 2 shows a part of a resilient contact piece 19 provided in the tube portion 17. Although not shown in detail, the resiliently deformable resilient contact piece 19 is disposed inside the tube portion 17. The resilient contact piece 19 extends inward from the inner wall of the tube portion 17. The mating terminal inserted into the tube portion 17 presses and resiliently deforms the resilient contact piece 19. By a resilient force of the resiliently deformed resilient contact piece 19, the mating terminal is sandwiched between the inner wall of the tube portion 17 and the resilient contact piece 19. In this way, the mating terminal and the terminal 12 are electrically connected.

As shown in FIG. 2, the wire connecting portion 20 in the form of a rectangular tube is provided behind the tube portion 17. The upper sandwiching portion 18A (an example of a sandwiching portion) is provided to extend rearward in a rear end part of the upper wall of the wire connecting portion 20, and the lower sandwiching portion 18B (an example of the sandwiching portion) is provided to extend rearward in a rear end part of the lower wall of the wire connecting portion 20. The upper and lower sandwiching portions 18A, 18B have a shape elongated in the front-rear direction. Lengths in the front-rear direction of the upper and lower sandwiching portions 18A, 18B are substantially equal.

A lower holding protrusion 23 projecting upward is provided on a rear end part on the upper surface of the lower sandwiching portion 18B.

The lower surface of the upper sandwiching portion 18A and the upper surface of the lower sandwiching portion 18B bite into an oxide film formed on the surface of the core 13 to peel off the oxide film, whereby a metal surface of the core 13 is exposed. By the contact of this metal surface and the upper and lower sandwiching portions 18A, 18B, the core 13 and the terminal body 15 are electrically connected.

[Slide Portion 16]

Figure 3:
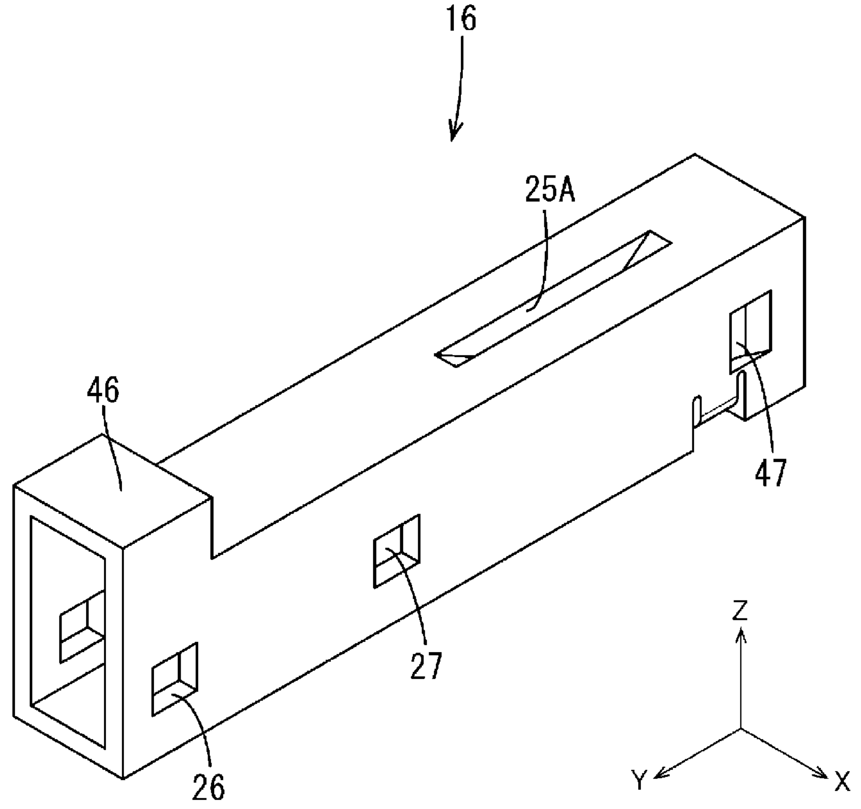
FIG. 3 is a perspective view showing the slide portion.

As shown in FIG. 3, the slide portion 16 is in the form of a rectangular tube extending in the front-rear direction. The slide portion 16 is formed by a known method such as cutting, casting or press-working if necessary. An arbitrary metal such as copper, copper alloy, aluminum, aluminum alloy or stainless steel can be appropriately selected as a metal constituting the slide portion 16 if necessary. Although not particularly limited, the slide portion 16 according to this embodiment is made of stainless steel. A plating layer may be formed on the surface of the slide portion 16. An arbitrary metal such as tin, nickel or silver can be appropriately selected as a metal constituting the plating layer if necessary.

A cross-section of the inner surface shape of the slide portion 16 is the same as or somewhat larger than that of the outer shape of a region of the terminal body 15 where the upper and lower sandwiching portions 18A, 18B are provided. In this way, the slide portion 16 is disposed outside the region of the terminal body 15 where the upper and lower sandwiching portions 18A, 18B are provided.

Figure 4:
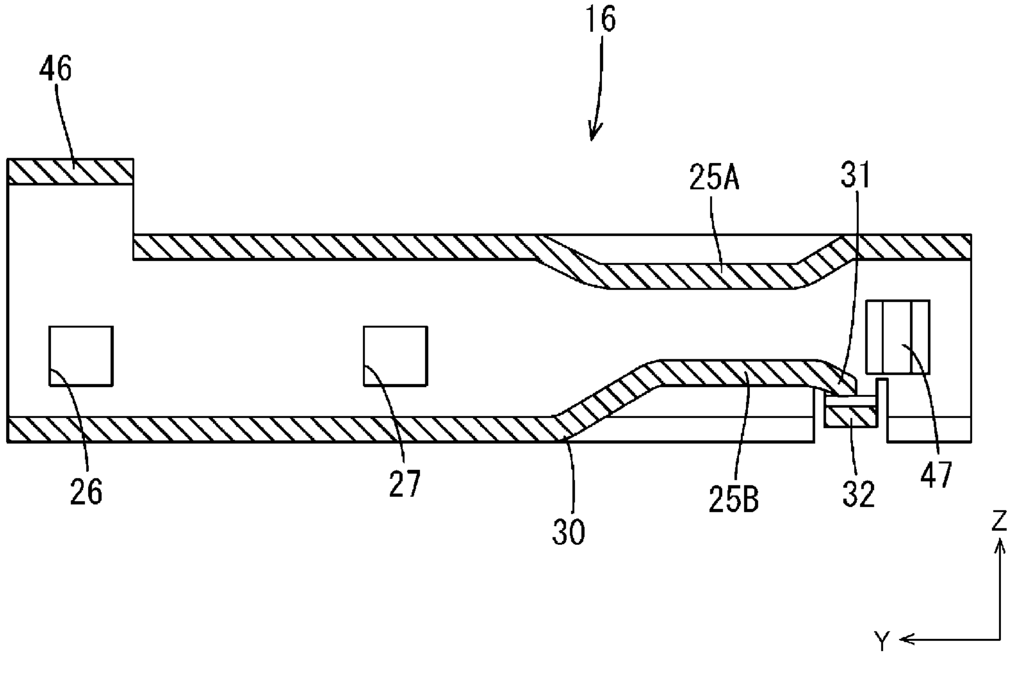
FIG. 4 is a section showing the slide portion.

As shown in FIG. 4, an upper pressurizing portion 25A projecting downward is provided on the upper wall of the slide portion 16. A lower pressurizing portion 25B (an example of a resilient pressurizing portion) projecting upward is provided on the lower wall of the slide portion 16.

As shown in FIG. 4, the lower pressurizing portion 25B is formed to obliquely extend to an upper-rear side from a position somewhat rearward of a center position of the slide portion in the front-rear direction and be bent to extend rearward. By forming this lower pressurizing portion 25B into a cantilever shape, the lower pressurizing portion 25B is formed to be resiliently deformable in the vertical direction.

As shown in FIG. 4, a front end part 30 of the lower pressurizing portion 25B serves as a fulcrum when the lower pressurizing portion 25B is resiliently deformed in the vertical direction. A rear end part of the lower pressurizing portion 25B extends up to substantially the same position as a rear end part of the upper pressurizing portion 25A. The rear end part of the lower pressurizing portion 25B is a so-called free end. The rear end part of the lower pressurizing portion 25B is obliquely bent to a lower-rear side to serve as a guide portion 31. If a front end part of the core 13 of the wire 11 contacts the guide portion 31, the core 13 moves forward while contacting the guide portion 13 and is guided into a clearance between the upper and lower pressurizing portions 25A, 25B.

Figure 5:
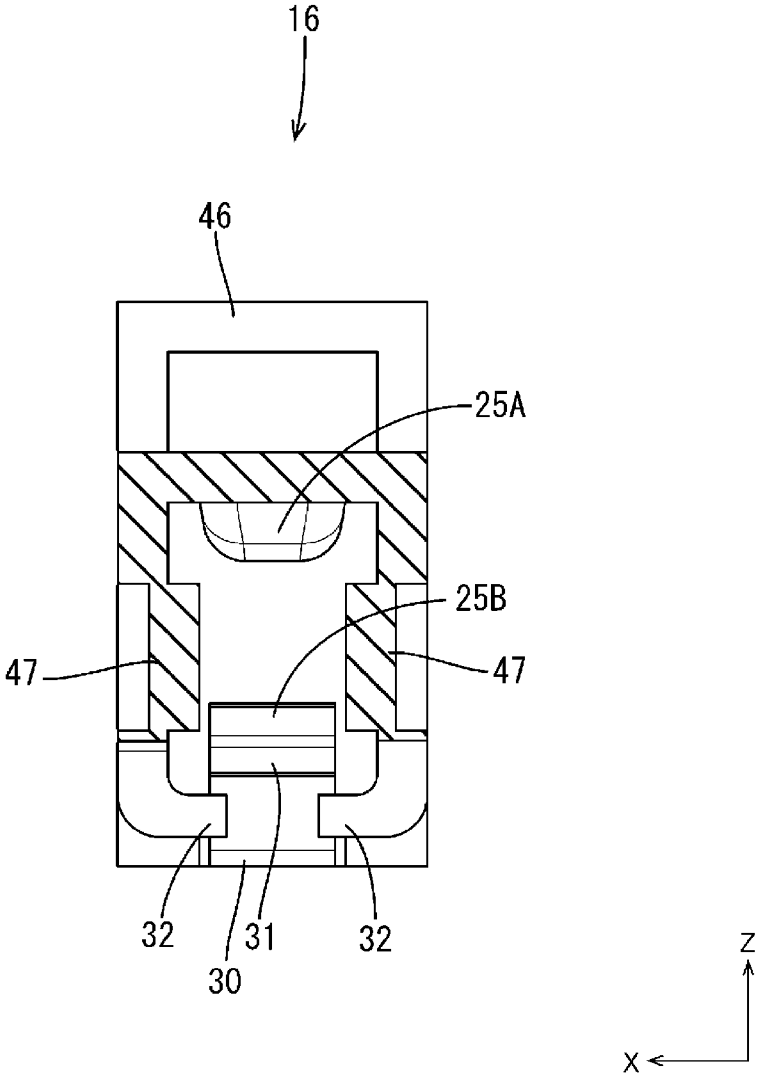
FIG. 5 is a section along V-V in FIG. 6.

As shown in FIG. 5, excessive deflection suppressing portions 32 projecting inward from the side walls of the slide portion 16 are formed at positions of the side walls of the slide portion 16 near a rear end part and below the guide portion 31 of the lower pressurizing portion 25B. The excessive deflection suppressing portions 32 are respectively formed to be cut and raised from both left and right side walls of the slide portion 16. In a state where the lower pressurizing portion 25B and the core 13 are not in contact, the guide portion 31 and the excessive deflection suppressing portions 32 are separated. By the contact of the guide portion 31 with the excessive deflection suppressing portions 32 from above, downward deformation of the lower pressurizing portion 25B beyond the excessive deflection suppressing portions 32 can be suppressed.

Figure 6:
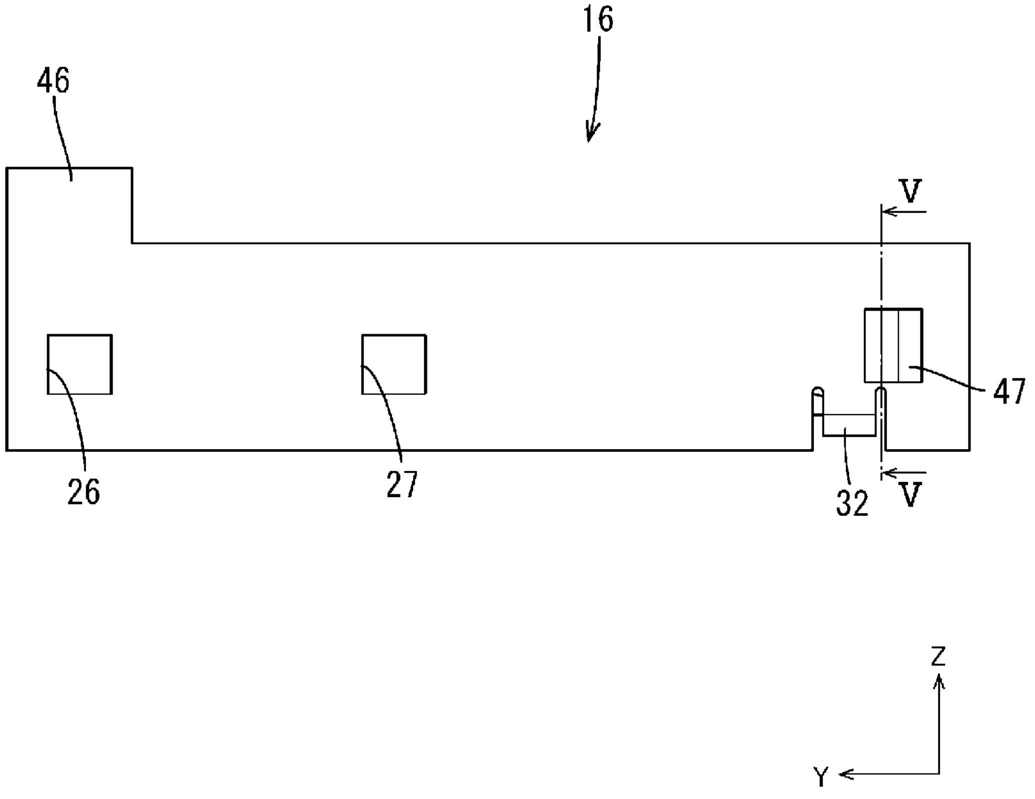
FIG. 6 is a side view showing the slide portion.

As shown in FIG. 6, a partial lock receiving portion 26 is open at a position near a front end part in the side wall of the slide portion 16. Further, a full lock receiving portion 27 is open at a position behind the partial lock receiving portion 26 in the side wall of the slide portion 16. The partial lock receiving portion 26 and the full lock receiving portion 27 are resiliently lockable to a locking projection 28 provided on the side wall of the terminal body 15 (see FIG. 1).

As shown in FIG. 2, with the locking projections 28 of the terminal body 15 and the partial lock receiving portions 26 of the slide portion 16 locked, the slide portion 16 is held at a partial locking position with respect to the terminal body 15. In this state, the upper and lower pressurizing portions 25A, 25B of the slide portion 16 are separated rearward from the rear end edges of the upper and lower sandwiching portions 18A, 18B of the terminal body 15.

Figure 9:
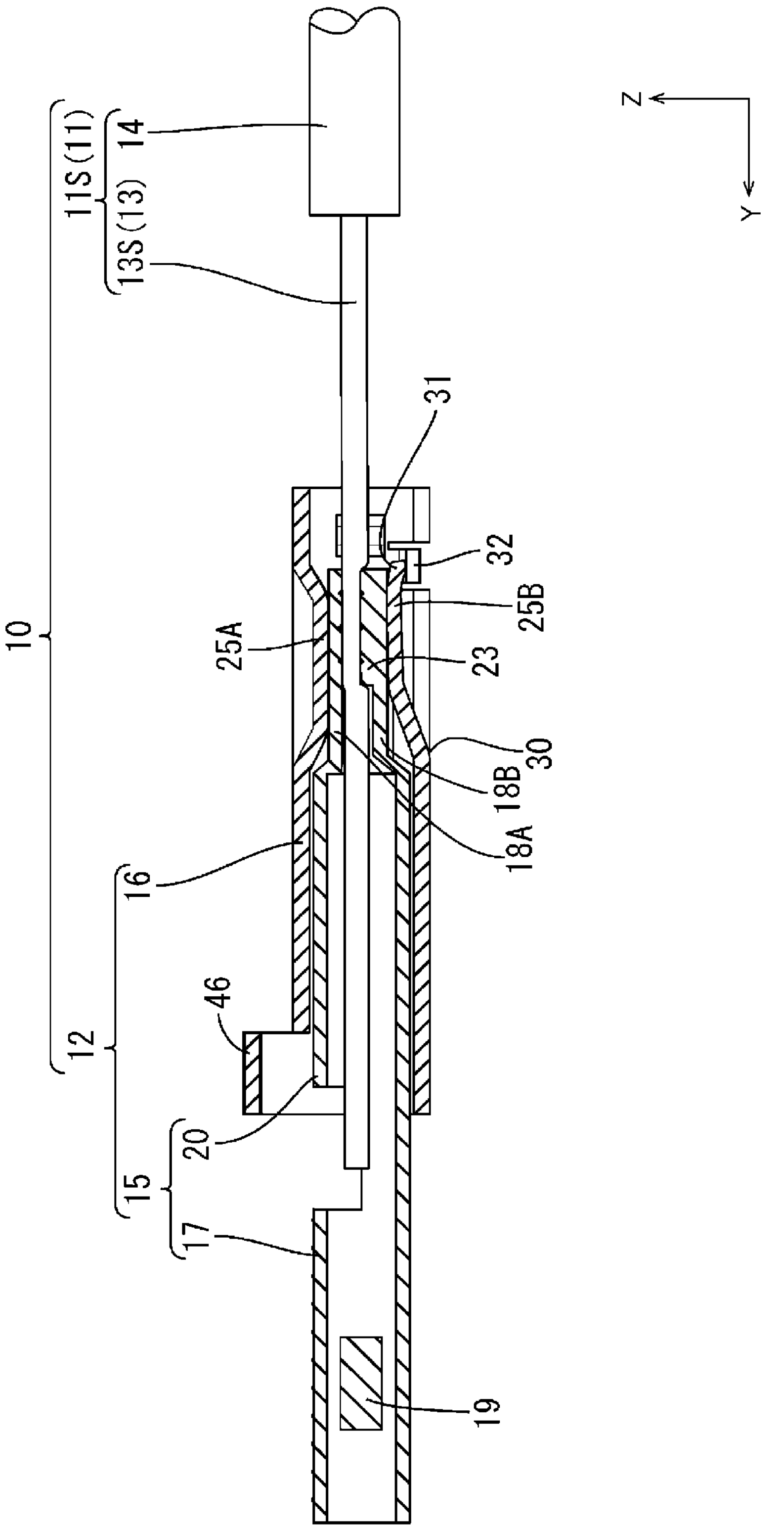
FIG. 9 is a section showing a state where the small-diameter wire and the terminal are connected by fully locking the terminal body and the slide portion.

With the locking projections 28 of the terminal body 15 and the full lock receiving portions 27 of the slide portion 16 locked, the slide portion 16 is held at a full locking position with respect to the terminal body 15. As shown in FIG. 9, in this state, the upper pressurizing portion 25A of the slide portion 16 is in contact with the upper sandwiching portion 18A from above the upper sandwiching portion 18A. Further, the lower pressurizing portion 25B of the slide portion 16 is in contact with the lower sandwiching portion 18B from below the lower sandwiching portion 18B.

As described above, the slide portion 16 is slidable between the partial locking position and the full locking position described above while being externally fit to the region of the terminal body 15 where the upper and lower sandwiching portions 18A, 18B are provided.

As shown in FIG. 9, with the slide portion 16 held at the full locking position with respect to the terminal body 15, the upper pressurizing portion 25A presses the upper sandwiching portion 18A from above, thereby deforming the upper sandwiching portion 18A downward. Further, the lower pressurizing portion 25B presses the lower sandwiching portion 18B from below, thereby deforming the lower sandwiching portion 18B upward. In this way, with the core 13 extending in the front-rear direction (extending direction) in a space between the upper and lower sandwiching portions 18A, 18B and the slide portion 16 held at the full locking position with respect to the terminal body 15, the core 13 is vertically sandwiched by the resiliently deformed upper and lower sandwiching portions 18A, 18B. That is, the upper sandwiching portion 18A contacts the core 13 from above by being pressed downward by the upper pressurizing portion 25A, and the lower sandwiching portion 18B contacts the core 13 from below by being pressed upward by the lower pressurizing portion 25B. The lower pressurizing portion 25B resiliently pressurizes the lower sandwiching portion 18B.

As shown in FIG. 9, with the slide portion 16 held at the full locking position with respect to the terminal body 15, the upper sandwiching portion 18A presses the core 13 from above and the lower holding protrusion 23 of the lower sandwiching portion 18B presses the core 13 from below. In this way, the core 13 is pressed from below by the lower holding protrusion 23, thereby being held in a state bent in the vertical direction (an example of a direction intersecting the extending direction). The core 13 and the terminal 12 are electrically connected also by the lower holding protrusions 23.

Figure 8:
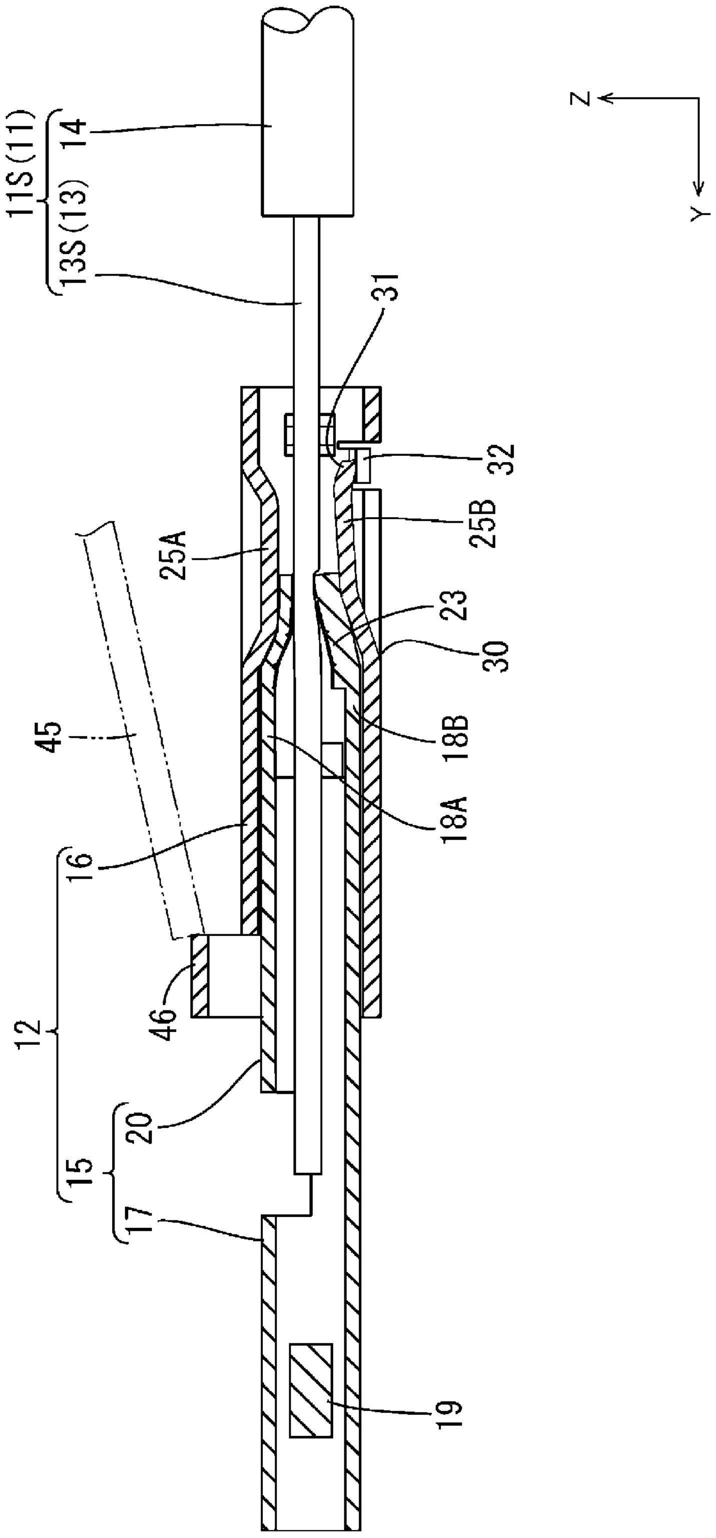
FIG. 8 is a section showing a state where the slide portion is pushed forward by a jig.

As shown in FIG. 8, a jig contact portion 46 projecting upward from the upper wall is provided in a front end part of the slide portion 16. By bringing a jig 45 into contact with the jig contact portion 46 from behind and pushing the slide portion 16 forward by this jig, the slide portion 16 is movable forward. Note that the jig 45 is relatively small in scale as compared to dies and a facility for operating these dies. Thus, a cost increase due to the jig 45 is suppressed.

As shown in FIGS. 5 and 6, a pair of guiding portions 47 projecting inwardly of the slide portion 16 are provided at positions near a rear end part of the slide portion 16 on both left and right side walls. The guiding portions 47 are formed to become narrower from the rear side toward the front side. The core 13 slides in contact with the inner surfaces of the guiding portions 47, thereby being guided into the slide portion 16.

[Connection Process of Wire 11]

Next, an example of a connection process of the wire 11 and the terminal 12 is described. The connection process of the wire 11 and the terminal 12 is not limited to the one described below.

The terminal body 15 and the slide portion 16 are formed by a known method. The slide portion 16 is assembled with the terminal body 15 from behind. The front end edge of the slide portion 16 comes into contact with the locking projections 28 of the terminal body 15 from behind and the side walls of the slide portion 16 are expanded and deformed. If the slide portion 16 is further pushed forward, the side walls of the slide portion 16 are restored and the partial lock receiving portions 26 of the slide portion 16 are locked to the locking projections 28 of the terminal body 15. In this way, the slide portion 16 is held at the partial locking position with respect to the terminal body 15. In this way, the terminal 12 is obtained.

The core 13 of the wire 11 is exposed by stripping the insulation coating 14 by a known method. In this embodiment, each of a small-diameter wire 11S including a small-diameter core 13S having a relatively small diameter and a large-diameter wire 11L including a large-diameter core 13L having a larger diameter than the small-diameter core 13S is connected to the terminal 12. Note that these cores are written as the cores 13 unless the small-diameter core 13S and the large-diameter core 13L are distinguished, and these wires are written as the wires 11 unless the small-diameter wire 11S and the large-diameter wire 11L are distinguished.

[Connection Process of Small-Diameter Wire 11S]

Figure 7:
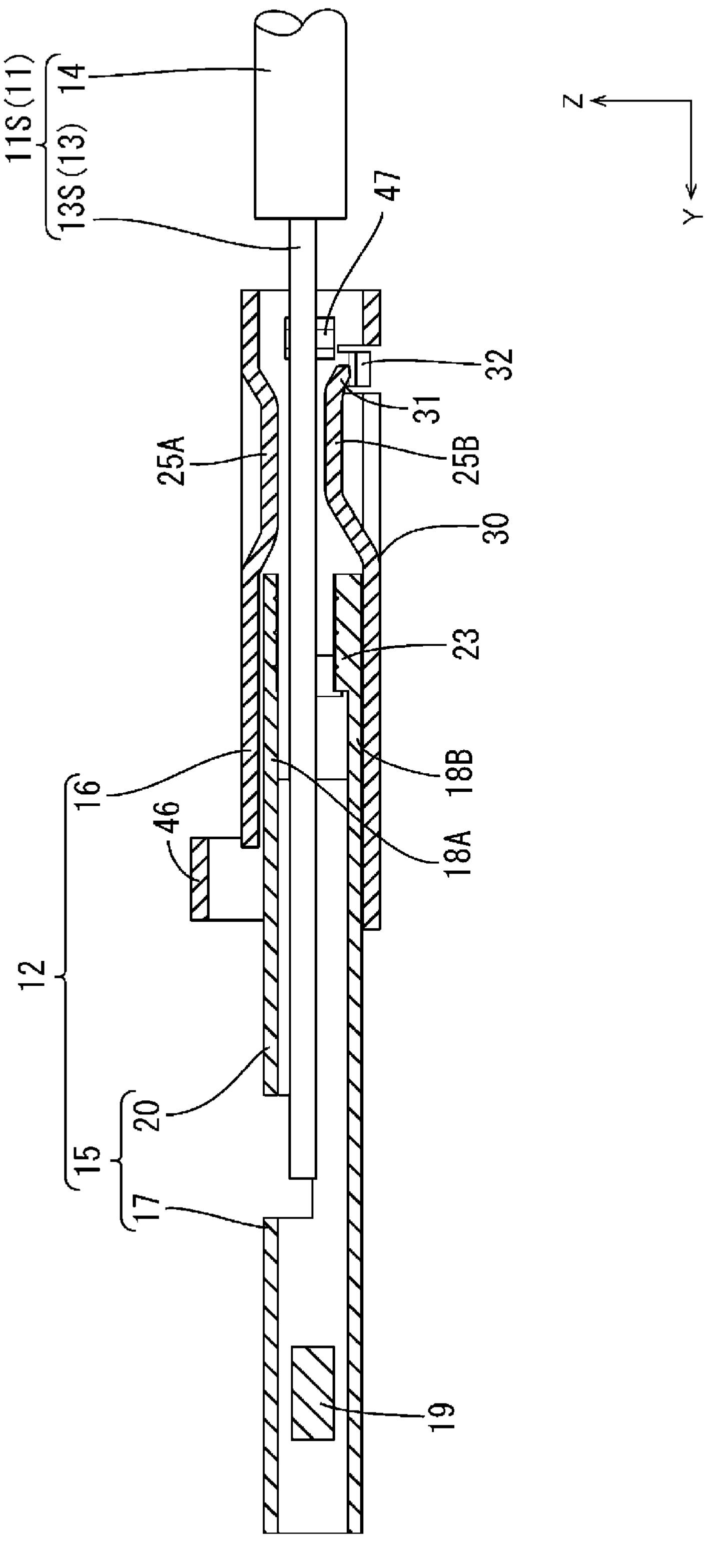
FIG. 7 is a section showing a state where a small-diameter wire is inserted in the terminal in which the terminal body and the slide portion are partially locked.

With reference to FIGS. 7 to 9, an example of a connection process of the small-diameter wire 11S and the terminal 12 is described. The connection process of the small-diameter wire 11S and the terminal 12 is not limited to the one described below. As shown in FIG. 7, the small-diameter core 13S is inserted from behind into the terminal 12 in a state where the terminal body 15 and the slide portion 16 are partially locked. The small-diameter core 13S is guided into the slide portion 16 by coming into contact with the guide portion 31 and the guiding portions 47 of the slide portion 16. If the small-diameter wire 11S is further pushed forward, a front end part of the small-diameter core 13S enters the terminal body 15 and reaches a space between the upper and lower sandwiching portions 18A, 18B.

As shown in FIG. 7, a lower end part of the guide portion 31 provided on the rear end part of the lower pressurizing portion 25B is separated from the excessive deflection suppressing portions 32.

Subsequently, as shown in FIG. 8, the slide portion 16 is slid forward by bringing the jig 45 into contact with the jig contact portion 46 from behind. The slide portion 16 is relatively moved forward with respect to the terminal body 15. At this time, locking between the locking projections 28 of the terminal body 15 and the partial lock receiving portions 26 of the slide portion 16 is released and the side walls of the slide portion 16 ride on the locking projections 28 to be expanded and deformed.

When the slide portion 16 is moved forward, the side walls of the slide portion 16 are restored and the locking projections 28 of the terminal body 15 and the full lock receiving portions 27 of the slide portion 16 are resiliently locked. In this way, the slide portion 16 is held at the full locking position with respect to the terminal body 15.

As shown in FIG. 8, with the slide portion 16 held at the full locking position with respect to the terminal body 15, the upper pressurizing portion 25A of the slide portion 16 comes into contact with the upper sandwiching portion 18A of the terminal body 15 from above to press the upper sandwiching portion 18A downward. Further, the lower pressurizing portion 25B of the slide portion 16 comes into contact with the lower sandwiching portion 18B of the terminal body 15 from below to be resiliently deformed, and presses the lower sandwiching portion 18B upward by a resilient force generated thereby.

As shown in FIG. 9, the small-diameter core 13S is sandwiched by the lower surface of the upper sandwiching portion 18A and the upper surface of the lower sandwiching portion 18B, whereby an oxide film formed on the surface of the small-diameter core 13S is peeled off to expose a metal surface constituting the small-diameter core 13S. By the contact of this metal surface with the upper and lower sandwiching portions 18A, 18B, the small-diameter wire 11S and the terminal 12 are electrically connected. In this state, the guide portion 31 of the lower pressurizing portion 25B and the excessive deflection suppressing portions 32 are separated.

With the small-diameter core 13S sandwiched from upper and lower sides by the upper and lower sandwiching portions 18A, 18B, the small-diameter core 13S is sandwiched by the upper sandwiching portion 18A and the lower holding protrusion 23 of the lower sandwiching portion 18B, thereby being held in the state extending in the front-rear direction and bent in the vertical direction. Since the small-diameter core 13S can be firmly held in this way, a holding force of the small-diameter wire 11S and the terminal 12 can be enhanced when a pulling force is applied to the small-diameter wire 11S.

[Connection Process of Large-Diameter Wire 11L and Terminal 12]

Figure 10:
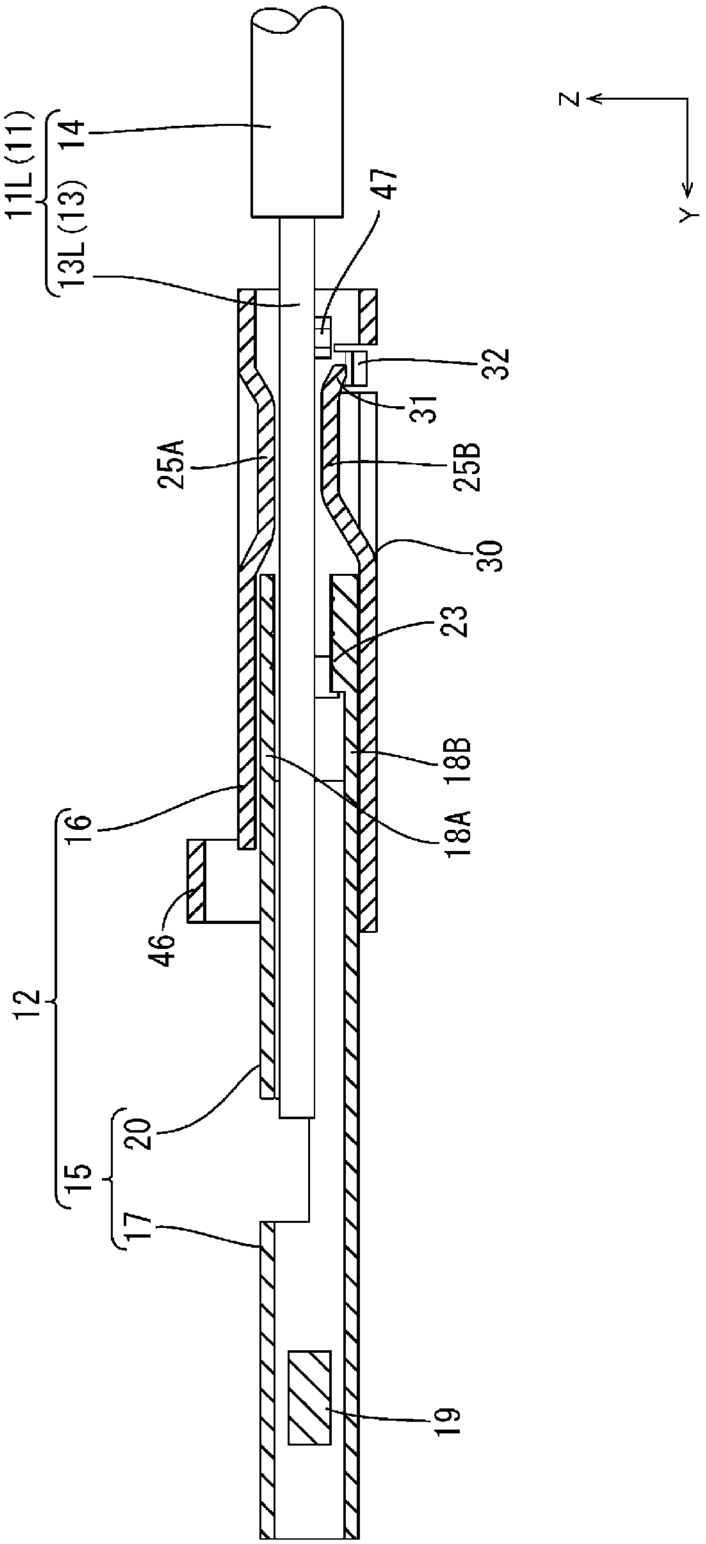
FIG. 10 is a section showing a state where a large-diameter wire is inserted in the terminal in which the terminal body and the slide portion are partially locked.
Figure 11:
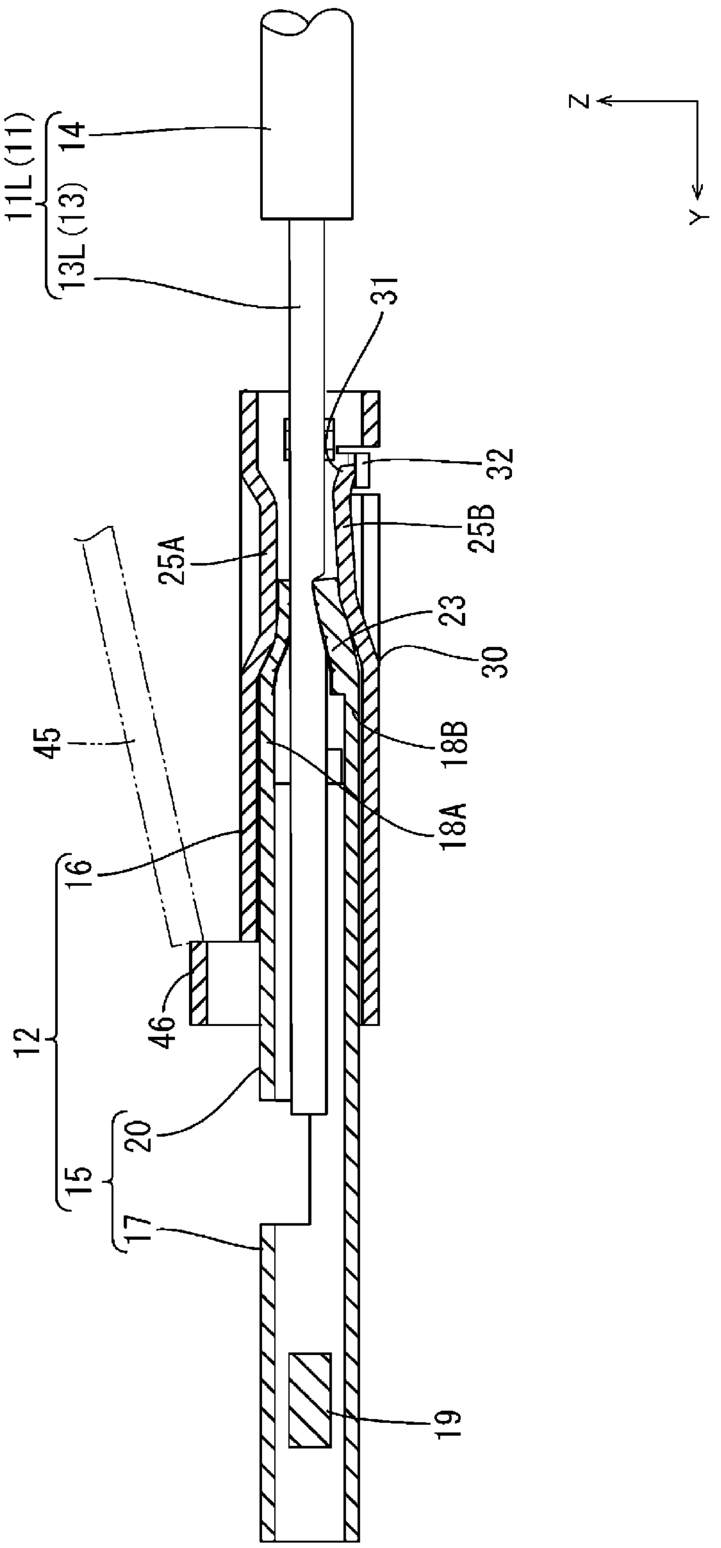
FIG. 11 is a section showing a state where the slide portion is pushed forward by the jig.
Figure 12:
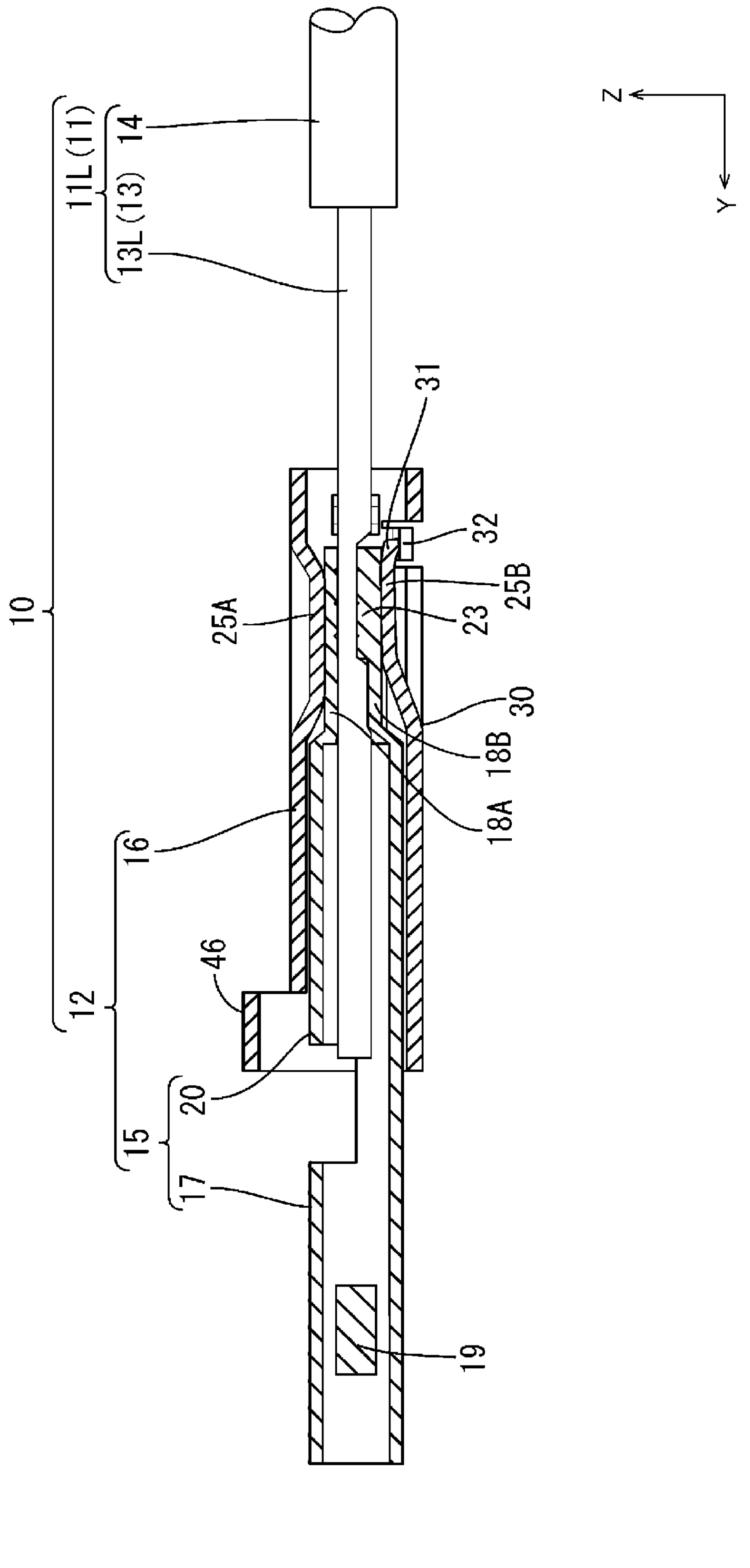
FIG. 12 is a section showing a state where the large-diameter wire and the terminal are connected by fully locking the terminal body and the slide portion.

With reference to FIGS. 10 to 12, an example of a connection process of the large-diameter wire 11L and the terminal 12 is described. The connection process of the large-diameter wire 11L and the terminal 12 is not limited to the one described below. Note that the same description as for the small-diameter wire 11S is appropriately omitted.

The large-diameter core 13L is inserted into the slide portion 16 from behind. The large-diameter core 13L is guided into the slide portion 16 by coming into contact with the guide portion 31 and the guiding portions 47 of the slide portion 16. A diameter of the large-diameter core 13L is slightly smaller than the clearance between the upper and lower pressurizing portions 25A, 25B. If the clearance between the upper and lower pressurizing portions 25A, 25B is relatively small for the large-diameter core 13L in this way, the guide portion 31 and the guiding portions 47 are effective. In this state, the lower end part of the guide portion 31 provided on the rear end part of the lower pressurizing portion 25B is separated from the excessive deflection suppressing portions 32.

Subsequently, as shown in FIG. 11, the slide portion 16 is slid forward by bringing the jig 45 into contact with the jig contact portion 46 from behind. The slide portion 16 is relatively moved forward with respect to the terminal body 15.

The upper and lower sandwiching portions 18A, 18B enter the clearance between the upper and lower pressurizing portions 25A, 25B. In this way, the upper sandwiching portion 18A is deformed downward and the lower sandwiching portion 18B is deformed upward.

The lower pressurizing portion 25B is pushed down by the lower sandwiching portion 18B. In this way, the lower end part of the guide portion 31 of the lower pressurizing portion 25B contacts the excessive deflection suppressing portions 32 from above. In this way, excessive deflection of the lower pressurizing portion 25B is suppressed.

As shown in FIG. 12, with the slide portion 16 held at the full locking position with respect to the terminal body 15, the upper pressurizing portion 25A of the slide portion 16 comes into contact with the upper sandwiching portion 18A of the terminal body 15 from above to press the upper sandwiching portion 18A downward. Further, the lower pressurizing portion 25B of the slide portion 16 comes into contact with the lower sandwiching portion 18B of the terminal body 15 from below to be resiliently deformed, and presses the lower sandwiching portion 18B upward by a resilient force generated thereby. The lower end part of the guide portion 31 provided on the lower pressurizing portion 25B contacts the excessive deflection suppressing portions 32 from above. In this way, excessive deflection of the lower pressurizing portion 25B is suppressed.

Functions and Effects of Embodiment

Next, functions and effects of this embodiment are described. The terminal 12 according to this embodiment is the terminal 12 to be connected to the front end part of the wire 11 and includes the terminal body 15 having the wire connecting portion 20 to be connected to the wire 11, and the slide portion 16 to be externally fit to the wire connecting portion 20, the wire connecting portion 20 includes the upper and lower sandwiching portions 18A, 18B extending rearward and configured to sandwich the wire 11, and the slide portion 16 includes the lower pressurizing portions 25B for resiliently pressurizing the lower sandwiching portion 18B toward the wire 11.

Further, the wire with terminal 10 according to this embodiment includes the above terminal 12 and the wire 11 connected to the terminal 12.

According to the present disclosure, the upper sandwiching portion 18A is pressurized toward the wire 11 by the upper pressurizing portion 25A and the lower sandwiching portion 18B is pressurized toward the wire 11 by the lower pressurizing portion 25B, whereby the wire 11 is sandwiched by the upper and lower sandwiching portions 18A, 18B. In this way, the terminal 12 and the wire 11 are electrically connected. As just described, since it is not necessary to electrically connect the terminal 12 and the wire 11 by a crimping operation, a relatively large-scale jig for crimping becomes unnecessary and the manufacturing cost of the terminal 12 can be reduced.

The springy lower pressurizing portion 25B is resiliently deformed according to a diameter of the wire 11. For example, the lower pressurizing portion 25B is resiliently deformed to a relatively small extent for the small-diameter wire 11S having a relatively small diameter. Since the lower sandwiching portion 18B is pressurized toward the small-diameter wire 11S by a resilient force generated by resilient deformation of the lower pressurizing portion 25B, the small-diameter wire 11S and the upper and lower sandwiching portions 18A, 18B are electrically connected with a proper contact pressure.

On the other hand, the lower pressurizing portion 25B is resiliently deformed to a relatively large extent according to a diameter of the large-diameter wire 11L. Since the lower sandwiching portion 18B is pressurized toward the large-diameter wire 11L by a resilient force of the lower pressurizing portion 25B, the large-diameter wire 11L and the upper and lower sandwiching portions 18A, 18B are electrically connected with a proper contact pressure.

As just described, according to the present disclosure, a deformation amount of the springy lower pressurizing portion 25B changes according to the wire diameter for the small-diameter wire 11S and the large-diameter wire 11L having different diameters. In this way, the wires 11S, 11L having different diameters are sandwiched with a proper contact pressure by the upper and lower sandwiching portions 18A, 18B by a resilient force generated by resilient deformation of the lower pressurizing portion 25B. As a result, the wires 11S, 11L having different diameters and the terminal 12 can be electrically connected.

Further, according to this embodiment, the lower pressurizing portion 25B is cantilevered rearward along the extending direction of the wire 11 and contacts the lower sandwiching portion 18B to be deflected, thereby resiliently pressurizing the lower sandwiching portion 18B.

Since the lower pressurizing portion 25B is cantilevered, the rear end part of the lower pressurizing portion 25B is a free end. Since a resilient deformation amount of the lower pressurizing portion 25B can be increased in this way, even a case where the diameters of the wires 11 are largely different can be dealt with.

Further, according to this embodiment, the slide portion 16 is provided with the excessive deflection suppressing portions 32 projecting inwardly of the slide portion 16, and the excessive deflection suppressing portions 32 suppress excessive deflection of the lower pressurizing portion 25B by contacting the lower pressurizing portion 25B.

Even if the wire 11 having a relatively large diameter is inserted into the wire connecting portion 20, the lower pressurizing portion 25B contacts the excessive deflection suppressing portions 32, whereby excessive deformation of the lower pressurizing portion 25B is suppressed. Since excessive deformation of the lower pressurizing portion 25B to a plastic deformation region is suppressed in this way, the lower pressurizing portion 25B is deformed within a resilient deformation region. As a result, a resilient force of a proper magnitude can be applied to the lower sandwiching portion 18B, wherefore the electrical connection reliability of the wire 11 and the terminal is improved.

Further, a deformation margin of the lower pressurizing portion 25B can be easily adjusted by adjusting a position where the excessive deflection suppressing portions 32 are provided.

Further, according to this embodiment, the slide portion 16 is disposed slidably along the extending direction of the wire 11 with respect to the wire connecting portion 20 and slides between a position for resiliently pressurizing the lower sandwiching portion 18B and a position for not resiliently pressurizing the lower sandwiching portion 18B.

Since the wire 11 and the terminal 12 can be electrically connected by a simple operation of sliding the slide portion 16 along the extending direction of the wire 11, the manufacturing cost of the terminal 12 can be reduced.

Further, according to this embodiment, the guide portion 31 for guiding the wire 11 into the wire connecting portion 20 by contacting the wire 11 is provided on the rear end part of the lower pressurizing portion 25B in the extending direction of the wire 11.

The front end part of the wire 11 slides in contact with the guide portion 31, thereby being guided into the wire connecting portion 20. In this way, the efficiency of a connecting operation of the wire 11 and the terminal 12 can be improved.

OTHER EMBODIMENTS (1) Although the lower pressurizing portion 25B is a resilient pressurizing portion in the above embodiment, there is no limitation to this and the upper pressurizing portion 25A may be a resiliently deformable resilient pressurizing portion. Further, both the upper and lower pressurizing portions 25A, 25B may be resilient pressurizing portions.

(2) The resilient pressurizing portion may be configured to extend forward along the extending direction of the wire.

(3) The excessive deflection suppressing portion 32 may be formed only on one side wall of the slide portion 16. Further, the excessive deflection suppressing portions 32 may be omitted.

(4) The terminal 12 may be a so-called male terminal.

(5) The slide portion 16 may be made of an insulating material such as synthetic resin or ceramic. The slide portion and the resilient pressurizing portion may be separate members and a springy separate resilient pressurizing portion may be assembled with a body of a slide portion, which is not springy.

(6) The guide portion 31 may be omitted.

(7) An upper holding protrusion projecting downward may be provided on the lower surface of the upper sandwiching portion 18A.

(8) If the diameter of the wire 11 is larger than the clearance between the upper and lower pressurizing portions 25A, 25B, the wire 11 may enter the slide portion 16 while contacting the lower pressurizing portion 25B and deforming the lower pressurizing portion 25B downward.

LIST OF REFERENCE NUMERALS

10: wire with terminal
11: wire
11L: large-diameter wire
11S: small-diameter wire
12: terminal
13: core
13L: large-diameter core
13S: small-diameter core
14: insulation coating
15: terminal body
16: slide portion (example of shell)
17: tube portion
18A: upper sandwiching portion (example of sandwiching portion)
18B: lower sandwiching portion (example of sandwiching portion)
19: resilient contact piece
20: wire connecting portion
23: lower holding protrusion
25A: upper pressurizing portion
25B: lower pressurizing portion (example of resilient pressurizing portion)
26: partial lock receiving portion
27: full lock receiving portion
28: locking projection
30: front end part
31: guide portion
32: excessive deflection suppressing portion
45: jig
46: jig contact portion
47: guiding portion

What is claimed is:

1. A terminal to be connected to a front end part of a wire in an extending direction, the terminal comprising:
- a terminal body including a wire connecting portion to be connected to the wire; and
- a shell having a form of a rectangular tube extending in the extending direction and configured to be externally fit to the wire connecting portion,
- wherein:
- the wire connecting portion includes a sandwiching portion extending in the extending direction of the wire, the sandwiching portion sandwiching the wire, and
- the shell includes a resilient pressurizing portion projecting inwardly of the shell and resiliently pressurizing the sandwiching portion toward the wire.

2. The terminal of claim 1, wherein the resilient pressurizing portion is cantilevered forward or rearward along the extending direction of the wire and resiliently pressurizes the sandwiching portion toward the wire by contacting the sandwiching portion to be deflected.

3. The terminal of claim 2, wherein:
- the shell is provided with an excessive deflection suppressing portion projecting inwardly of the shell, and
- the excessive deflection suppressing portion suppresses excessive deflection of the resilient pressurizing portion by contacting the resilient pressurizing portion.

4. The terminal of claim 1, wherein:

the shell is disposed slidably along the extending direction of the wire with respect to the wire connecting portion, and the shell slides between a position for resiliently pressurizing the sandwiching portion and a position for not resiliently pressurizing the sandwiching portion.

5. The terminal of claim 1, wherein a guide portion guiding the wire into the wire connecting portion by contacting the wire is provided on a rear end part of the resilient pressurizing portion in the extending direction of the wire.

6. A wire with terminal, comprising:

the terminal of claim 1; and the wire connected to the terminal.

7. The terminal of claim 1, wherein the resilient pressurizing portion is formed to be resiliently deformable in a vertical direction.

8. The terminal of claim 7, wherein a front end part of the resilient pressurizing portion serves as a fulcrum when the resilient pressurizing portion is resiliently deformed in the vertical direction.

* * * * *